(12) United States Patent
Kim

(10) Patent No.: US 12,297,881 B2
(45) Date of Patent: May 13, 2025

(54) BRAKE MODULE

(71) Applicant: DAS CO., LTD, Gyeongju-si (KR)

(72) Inventor: Jae Youn Kim, Ulsan (KR)

(73) Assignee: DAS CO., LTD, Gyeongju-si (KR)

( * ) Notice: Subject to any disclaimer, the term of this patent is extended or adjusted under 35 U.S.C. 154(b) by 0 days.

(21) Appl. No.: 18/390,539

(22) Filed: Dec. 20, 2023

(65) Prior Publication Data
US 2024/0209904 A1 Jun. 27, 2024

(30) Foreign Application Priority Data
Dec. 21, 2022 (KR) .......... 10-2022-0180146

(51) Int. Cl.
*F16D 67/02* (2006.01)
*B60N 2/16* (2006.01)

(52) U.S. Cl.
CPC .............. *F16D 67/02* (2013.01); *B60N 2/165* (2013.01)

(58) Field of Classification Search
CPC .............. F16D 41/04; F16D 67/00–02; F16D 41/064–067; F16D 41/086–105; B60N 2/1635; B60N 2/165; B60N 2/167; B60N 2/169; B60N 2/185; B60N 2/1864; B60N 2/1882; B60N 2/1896; B60N 2/2213; B60N 2/2227; B60N 2/224; B60N 2/2257
See application file for complete search history.

(56) References Cited

U.S. PATENT DOCUMENTS 10,661,685 B2 * 5/2020 Kim .................. F16D 41/06

FOREIGN PATENT DOCUMENTS

| KR | 20120084593 A | * | 7/2012 | ............. B60N 2/16 |
| WO | WO-2018066652 A1 | * | 4/2018 | ............. F16D 41/10 |

* cited by examiner

*Primary Examiner* — James J Taylor, II
(74) *Attorney, Agent, or Firm* — Tarolli, Sundheim, Covell & Tummino LLP

(57) ABSTRACT

A brake module capable of preventing the occurrence of flow in a free hinge in the event of the occurrence of a collision, etc., is provided. The brake module is provided on a support frame installed in a vehicle, is connected to an object provided to relatively rotate with respect to the support frame and restrains the rotation of the object, and releases the rotation restraint of the object when an external force is applied. With this configuration, it is possible to prevent the occurrence of flow in a free hinge in the event of the occurrence of a collision, etc., and to prevent the deformation of a seat frame, so that passenger safety accidents can be prevented.

2 Claims, 5 Drawing Sheets

[FIG. 1]
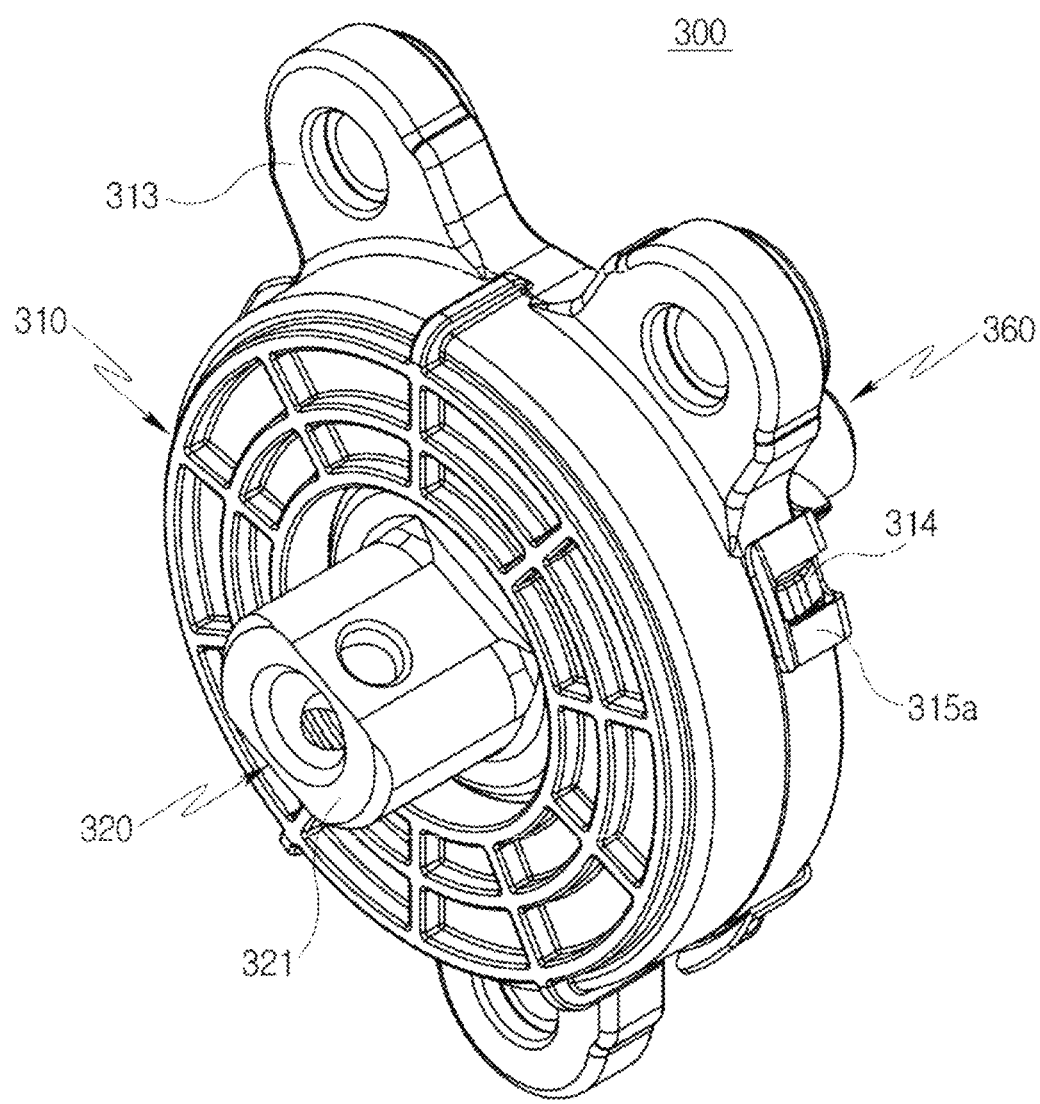

[FIG. 2]
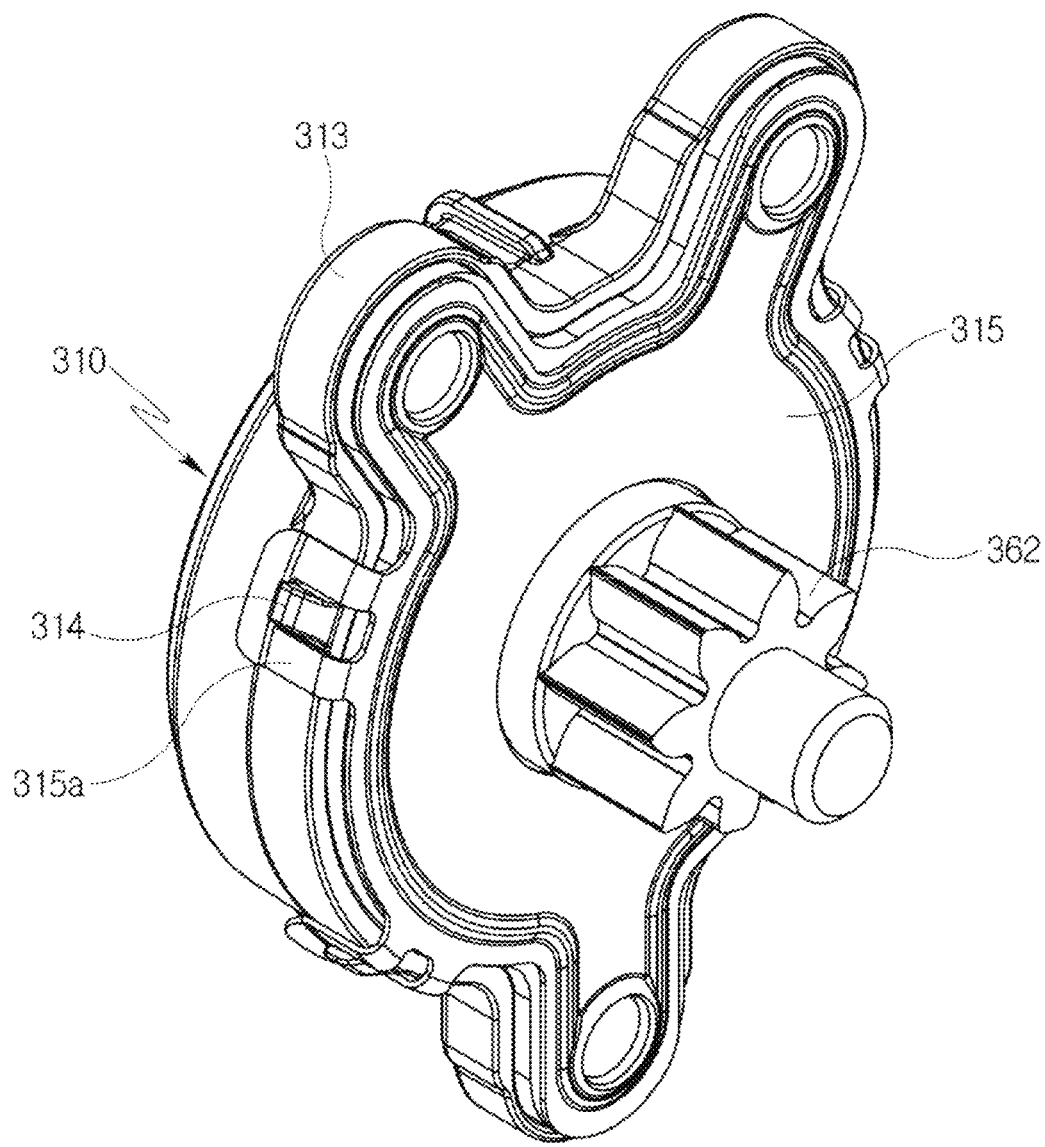

[FIG. 3]
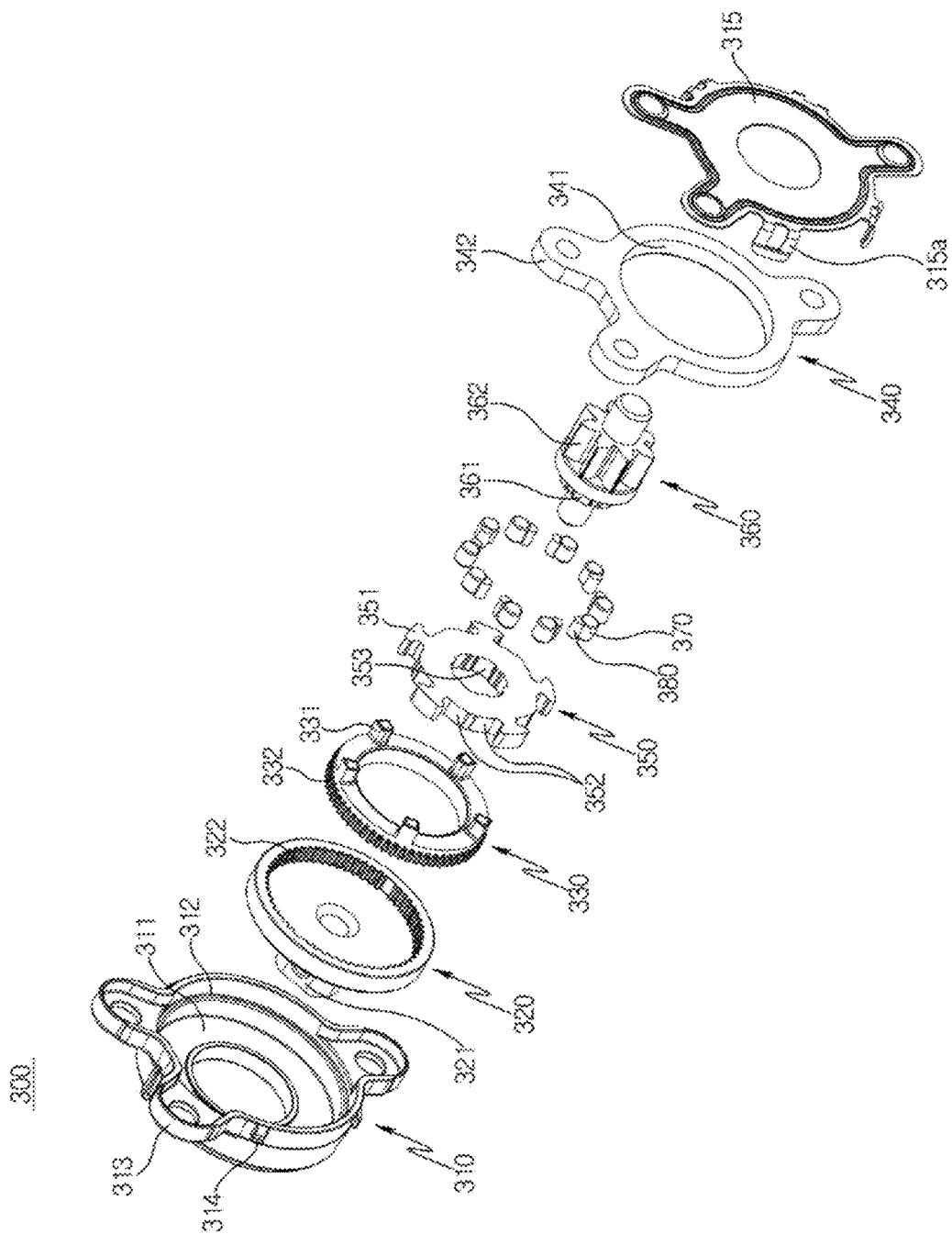

[FIG. 4]
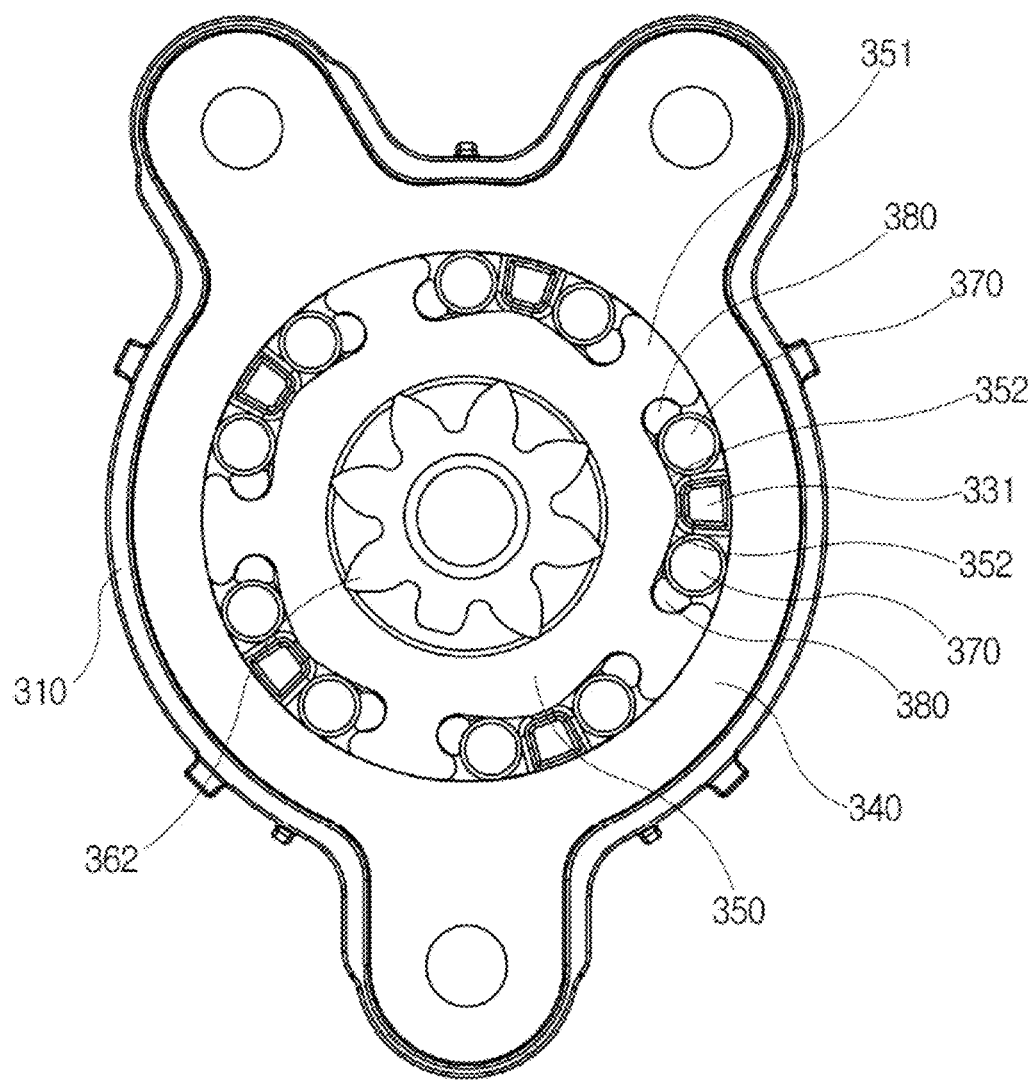

[FIG. 5]
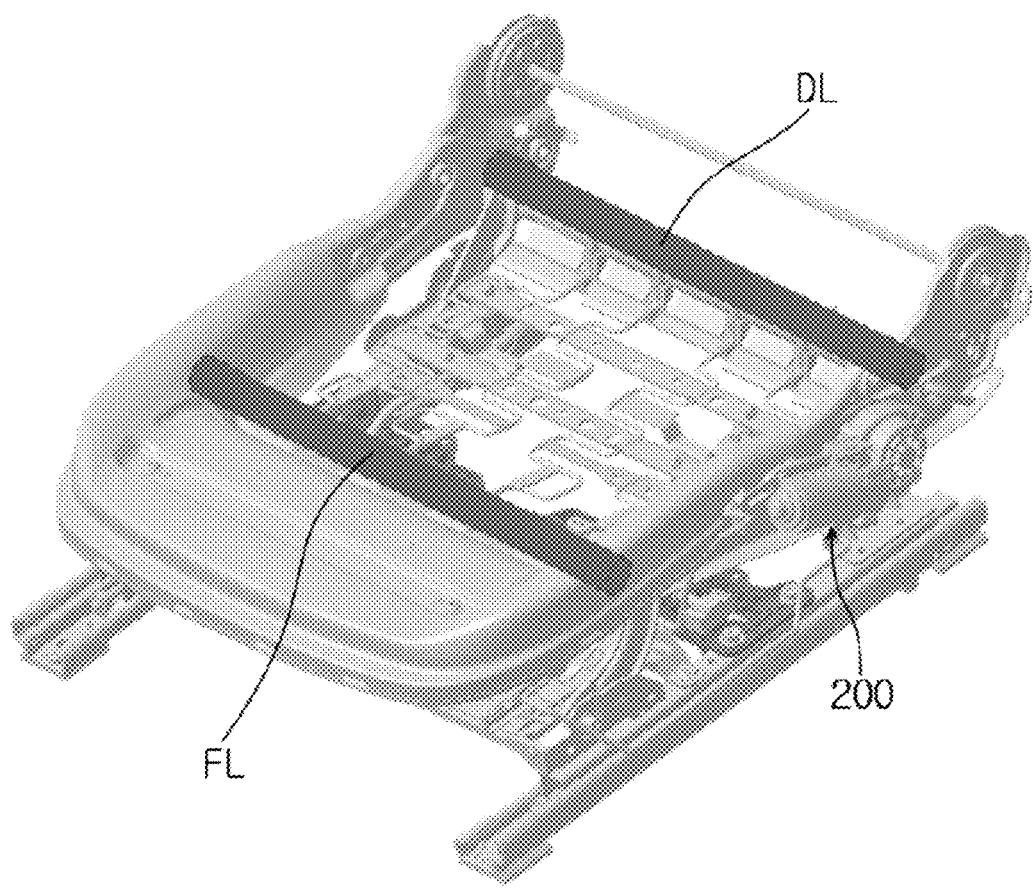

BRAKE MODULE

CROSS REFERENCE TO RELATED APPLICATION

The present application claims priority to Korea Patent Application No. 10-2022-0180146, filed Dec. 21, 2022, the entire contents of which is incorporated herein for all purposes by this reference.

FIELD

The present disclosure relates to a brake module and more particularly to a brake module capable of preventing the occurrence of flow in a free hinge in the event of the occurrence of a collision, etc.

BACKGROUND

In general, a seat of a vehicle includes a seat cushion that supports passenger's lower body, a seat back that supports passenger's upper body, and a headrest that supports passenger's head and neck, and thus, provides comfortable ride to the passenger.

Recently released vehicles are equipped with a seat height adjustment device that adjusts the height of the seat to ensure the passenger's driving posture and visibility. In addition, a tilting device is applied to support the passenger's lower body more comfortably. The tilting device lifts the front portion of the cushion part obliquely upward and increases the feeling of sitting and being supported for the passenger's lower body, thereby performing a function of preventing the passenger from being pushed forward during sudden braking.

In the case of a conventionally presented seat of a vehicle, in order to adjust the height of the seat, one of four height links that rotatably fastens the support frame and cushion frame installed in the vehicle is rotated by using a driving part such as a pumping device, an actuator, or a height motor, etc. This intends to create a comfortable posture of the passenger.

However, the above-mentioned four height links are rotatably fastened to the frame, and only one height link is connected to the driving part. Therefore, in the event of a collision of the vehicle, etc., the height link connected to the driving part is restrained to the driving part, but the remaining three height links are in a free state. Accordingly, there is a problem that a seat frame may be distorted and deformed.

SUMMARY

The present disclosure is designed to solve such a problem mentioned above and the purpose of the present disclosure is to provide a brake module capable of preventing the occurrence of flow in a free hinge in the event of the occurrence of a collision, etc.

One embodiment is a brake module that is configured to be provided on a support frame installed in a vehicle, is connected to an object provided to relatively rotate with respect to the support frame and restrains the rotation of the object, and releases the rotation restraint of the object when an external force is applied.

More specifically, the brake module may include: a housing that is installed on the support frame; an input unit that is rotatably installed in the housing and rotates when an external force is applied; a control member that is fastened to and rotates together with the input unit and has a plurality of control protrusions formed in an axial direction; a brake ring that is fixed to the housing; a wedge ring that is rotatably installed on an inner peripheral surface of the brake ring and has a plurality of wedge protrusions formed in a radial direction; an output unit that is fastened to and rotates together with the wedge ring and is connected to the object; and a plurality of brake rollers that is provided between the wedge ring and the brake ring and between the control protrusion and the wedge protrusion and restrains the rotation of the wedge ring or releases the rotation restraint of the wedge ring, with respect to the brake ring.

Here, the wedge ring may include a pair of wedge surfaces formed to be inclined upward toward the brake ring between the wedge protrusion and the wedge protrusion. The control protrusion may be disposed between the pair of wedge surfaces. The brake roller may be disposed on both sides of the control protrusion. An elastic member which presses the brake roller toward the control protrusion may be provided.

With this configuration, the brake roller is fitted to the inner peripheral surface of the brake ring and the wedge surface in a wedge shape, so that the rotation of the output unit is locked.

Also, when the input unit is rotated by an external force, the control protrusion rotates to move the brake roller fitted in a wedge shape to the wedge surface and the inner peripheral surface of the brake ring, so that the fitted brake roller is released, and then the output unit is rotated.

BRIEF DESCRIPTION OF THE DRAWINGS

FIG. 1 is one side perspective view showing schematically a brake module according to an embodiment of the present disclosure;

FIG. 2 is another side perspective view showing schematically the brake module according to the embodiment of the present disclosure;

FIG. 3 is an exploded perspective view showing schematically the brake module according to the embodiment of the present disclosure;

FIG. 4 is a front view showing schematically the inside of the brake module according to the embodiment of the present disclosure; and FIG. 5 is a view showing schematically an example of a portion where the brake module according to the embodiment of the present disclosure can be installed.

DETAILED DESCRIPTION

Hereinafter, preferred embodiments of the present invention will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

Terms used in the present specification are provided for description of only specific embodiments of the present invention, and not intended to be limiting. An expression of a singular form includes the expression of plural form thereof unless otherwise explicitly mentioned in the context.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Hereinafter, specific embodiments of the present invention will be described with reference to the accompanying drawings.

FIGS. 1 and 2 are perspective view showing schematically a brake module according to an embodiment of the present disclosure. FIG. 3 is an exploded perspective view showing schematically the brake module according to the embodiment of the present disclosure. FIG. 4 is a front view showing schematically the inside of the brake module according to the embodiment of the present disclosure. FIG. 5 is a view showing schematically an example of a portion where the brake module according to the embodiment of the present disclosure can be installed.

Referring to FIGS. 1 to 5, a brake module 300 according to the embodiment of the present disclosure is provided on a support frame installed in a vehicle, is connected to an object (not shown) provided to relatively rotate with respect to the support frame (not shown) and locks the rotation of the object, and releases the locked rotation of the object when an external force is applied.

More specifically, the brake module 300 includes a housing 310 that is installed on the support frame, an input unit 320 that is rotatably installed in the housing 310 and rotates when an external force is applied, a control member 330 that is fastened to and rotates together with the input unit 320 and has a plurality of control protrusions 331 formed in an axial direction, a brake ring 340 that is fixed to the housing 310, a wedge ring 350 that is rotatably installed on an inner peripheral surface 341 of the brake ring 340 and has a plurality of wedge protrusions 351 formed in a radial direction, an output unit 360 that is fastened to and rotates together with the wedge ring 350 and is connected to the object, and a plurality of brake rollers 370 that is provided between the wedge ring 350 and the brake ring 340 and between the control protrusion 331 and the wedge protrusion 351 and locks the rotation of the wedge ring 350 or releases the locked rotation of the wedge ring 350, with respect to the brake ring 340.

That is, the brake module 300 is provided between two components (support frame and object) provided to relatively rotate with respect to each other. When the brake module is stopped, the output unit 360 is locked from rotation by the brake roller 370. Therefore, this locks the two components from relative rotation with respect to each other. Also, when the input unit 320 is rotated by an external force, the control member 330 rotates and the control protrusion 331 moves the brake roller 370, and thus, the locking is released and the output unit 360 becomes rotatable. This allows the two components to relatively rotate with respect to each other.

The brake module 300 may be provided on a hinge of an interlocking link that rotates in conjunction with a driving unit for adjusting the height of a seat or for operating relaxation or a leg rest.

As an example, the brake module 300 may be provided on the support frame on the opposite side of a driving unit 200. The input unit 320 may be connected to a driving link DL that is rotated by the driving unit 200. The output unit 360 may be configured to be connected to the hinge that rotates. With this configuration, when the driving unit 200 is not operating, the brake module 300 locks the driving link DL such that the driving link DL does not rotate. When the driving unit 200 operates to rotate the input unit 320, the locking is released and the driving link DL becomes rotatable, so that the driving unit 200 is allowed to adjust the seat height or to operate in a relaxation mode.

Alternatively, the brake module 300 may be connected to a free link FL that is not interlocked with the driving unit 200. In this case, a separate lever, etc., may be provided to rotate the input unit 320. With this configuration, when the lever is not operating, the rotation of the free link FL is locked by the brake module 300, and when the lever is operated, the input unit 320 rotates and the locking is released, so that the free link FL may be provided to rotate.

FIG. 5 shows an example where the brake module 300 is applied to a configuration that can adjust the height of the seat or operate in a relaxation mode. The brake module 300 is provided between components that relatively rotate with respect to each other, such as the hinge for operating the leg rest, so that the relative rotation is locked or the locking is released.

The housing 310 receives the components therewithin and is installed on the support frame provided in the vehicle.

To this end, the housing 310 includes an input unit receiving recess 311 that has open one side and receives the input unit 320 therewithin, and includes a brake ring receiving groove 312 that receives the brake ring 340. In addition, the housing 310 is formed with a plurality of coupling portions 313 that protrudes outward in the radial direction from the outer peripheral surface of the housing and is fastened to the support frame.

In addition, the housing 310 further includes a housing cover 315 that closes the one open side after all of the components are received therein. The housing cover 315 has a plurality of hooks 315a formed around the outer peripheral surface thereof in the axial direction, and has a catching portion 314 formed around the outer peripheral surface of the housing 310 in response to the hook. Accordingly, the housing cover 315 can be caught by the hook 315a and be fastened to the housing 310.

The input unit 320 is formed in a disk shape and is inserted into the input unit receiving recess 311 and rotated. A separate link or a lever for applying an external force, or the like is fastened to an external force application unit 321 that has passed through and protruded outward from the housing 310, and then they rotate together. In addition, the input unit 320 has a recess formed, in such a manner as to receive therewithin, on the opposite side to the surface on which the external force application unit 321 is formed. A control member fastening part 322 which is fastened to the control member 330 is formed on the inner peripheral surface of the recess. Additionally, a fastening protrusion 332 which is fastened to the control member fastening part 322 is formed on the outer peripheral surface of the control member 330. Here, the control member fastening part 322 and the fastening protrusion 332 may be formed in the form of gear teeth and meshed with each other.

The control member 330 is inserted and fastened to the recess of the input unit 320 such that they rotate together. The plurality of control protrusions 331 are formed to protrude radially in the axial and circumferential directions.

The brake ring 340 is formed in a ring shape and has a coupling portion 342. The coupling portion 342 is formed at a position corresponding to the coupling portion 313 formed on the housing 310 and protrudes outward in the radial direction from the outer peripheral surface of the ring-shaped body. Through this, a fastening member (not shown)

is inserted into the coupling portion 342 of the brake ring 340 and the coupling portion 313 of the housing 310 at the same time, so that the brake module 300 is fastened to the support frame. Also, the control protrusion 331 of the control member 330 is disposed on the inner peripheral surface 341 of the brake ring 340.

The wedge ring 350 is rotatably installed on the inner peripheral surface 341 of the brake ring 340, and the plurality of wedge protrusions 351 is formed in the radial direction. Here, the wedge protrusion 351 is disposed between the control protrusions 331.

In addition, the wedge ring 350 has a pair of wedge surfaces 352 formed to be inclined upward toward the brake ring 340 between the wedge protrusion 351 and the wedge protrusion 351. The control protrusion 331 is disposed between the pair of wedge surfaces 352, and the brake roller 370 is disposed on both sides of the control protrusion 331.

One side end of the output unit 360 is fitted and fastened to the wedge ring 350 and they rotate together, and the other side end rotates the object. That is, when the input unit 320 is rotated by an external force, the control member 330 rotates to rotate the wedge ring 350, and the output unit 360 rotates together with the wedge ring 350. Accordingly, the object is rotated.

The brake roller 370 is provided between the wedge ring 350 and the brake ring 340 and between the control protrusion 331 and the wedge protrusion 351, and locks the rotation of the wedge ring 350 or releases the locked rotation of the wedge ring 350, with respect to the brake ring 340.

That is, when the brake roller 370 moves toward the control protrusion 331 on the wedge surface 352, a gap between the wedge surface 352 and the inner peripheral surface 341 of the brake ring 340 is narrowed, so that the brake roller 370 is fitted in a wedge shape, and thus, the rotation of the output unit 360 is locked. When the brake roller 370 moves toward the wedge protrusion 351, the gap between the wedge surface 352 and the inner peripheral surface 341 of the brake ring 340 is narrowed, so that the fitted brake roller 370 is released and the output unit 360 becomes rotatable.

For such an operation, an elastic member 380 that presses the brake roller 370 toward the control protrusion 331 may be further provided.

With this configuration, when no external force is applied, the brake roller 370 is pressed toward the control protrusion 331 by an elastic force of the elastic member 380, and is fitted to the narrowing inner peripheral surface of the brake ring 340 and the wedge surface 352 in a wedge shape, so that the rotation of the output unit 360 is locked and thus, the rotation of the object is locked.

Also, when the input unit 320 is rotated by applying an external force, the control protrusion 331 rotates to move the brake roller 370 fitted in a wedge shape to the wedge surface 352 and the inner peripheral surface of the brake ring 340, so that the fitted brake roller is released, and then the output unit 360 is rotated and the object is rotated.

The brake module according to the embodiment of the present disclosure prevents the occurrence of flow in a free hinge in the event of the occurrence of a collision, etc., and prevents the deformation of a seat frame, so that passenger safety accidents can be prevented.

Although the present invention has been described above by way of the specific embodiments, this is for describing the present invention in detail. The present invention is not limited thereto and it is clear that the present invention can be modified or improved within the spirit of the present invention by those of ordinary skill in the art.

All simple modifications or changes of the present invention fall within the scope of the present invention. The specific scope of protection of the present invention will be apparent by the appended claims.

REFERENCE NUMERALS

| | |
|---|---|
| 300: Brake Module | 310: Housing |
| 315: Housing Cover | 320: Input Unit |
| 330: Control Member | 331: Control Protrusion |
| 340: Brake Ring | 350: Wedge Ring |
| 351: Wedge Protrusion | 352: Wedge Surface |
| 360: Output Unit | 370: Brake Roller |
| 380: Elastic Member | |

What is claimed is:

1. A brake module that is provided on a support frame installed in a vehicle, is connected to an object provided to relatively rotate with respect to the support frame and restrains the rotation of the object, and releases the rotation restraint of the object when an external force is applied, the brake module comprising:
    a housing that is installed on the support frame;
    an input unit that is rotatably installed in the housing and rotates when the external force is applied, the input unit having a recess defined therein, the input unit having a fastening part formed on an inner periphery of the recess;
    a control member having fastening protrusions defined on an outer periphery surface, the control member disposed inside the input unit such that the fastening protrusions engage the fastening part of the input unit to rotate with the input unit, the control member having a plurality of control protrusions formed in an axial direction;
    a brake ring that is fixed to the housing;
    a wedge ring that is rotatably installed on an inner peripheral surface of the brake ring and has a plurality of wedge protrusions formed in a radial direction;
    an output unit that is fastened to and rotates together with the wedge ring and is connected to the object;
    a plurality of brake rollers provided between the wedge ring and the brake ring and between one of the plurality of control protrusions and one of the plurality of wedge protrusions, the plurality of brake rollers restraining or releasing rotation of the wedge ring with respect to the brake ring; and
    a plurality of elastic members that press a pair of the plurality of brake rollers toward one of the plurality of control protrusions,
    wherein the plurality of brake rollers lock rotation of the output unit by the elastic force of the plurality of elastic members, and
    wherein, when the input unit is rotated by the external force, the plurality of control protrusions rotate to move the brake rollers to rotate the output unit.

2. The brake module of claim 1, wherein the wedge ring comprises a pair of wedge surfaces formed to be inclined upward toward the brake ring between a wedge protrusion and an adjacent wedge protrusion of the plurality of wedge protrusions, wherein a control protrusion of the plurality of control protrusions is disposed between the pair of wedge surfaces, wherein a brake roller of the plurality of brake rollers is disposed on each side of the control protrusion.

* * * * *